United States Patent Office 3,099,350
Patented July 30, 1963

3,099,350
PACKAGING FILMS AND PACKAGE
PRODUCED THEREFROM
John E. Hammond, Rochester, N.Y., assignor to National Distillers and Chemical Corporation, a corporation of Virginia
No Drawing. Filed Dec. 14, 1959, Ser. No. 859,134
9 Claims. (Cl. 206—46)

The present invention relates generally to improved thermoplastic sheeting and films, and specifically to new, fogging resistant polyolefin wrapping materials which are especially adapted to wrapping moisture containing, and moisture emitting products such as fresh meats, poultry, fresh vegetables and the like, and especially for packaging products which are subjected to refrigeration while so packaged. It is especially adapted for making such packaging materials from thermoplastic polymers of ethylene and propylene and copolymers thereof.

It is an object of this invention to provide a method for making transparent, anti-fogging packaging materials using thermoplastic, polyolefin sheeting and/or films.

It is a further object of the invention to provide an improved transparent wrapping material for packaging moisture containing food products, in which the wrapping material is resistant to fogging caused by moisture condensation thereon when the wrapped products are subjected to temperature changes.

Another object is to provide a wrapping material for moisture containing products for which a polyolefin film is the base material.

It is a further object of this invention to provide an improved, transparent, flexible, wrapping material, which is resistant to fogging when used to encase moisture-containing food products, normally subjected to refrigeration, by coating a polyolefin film.

Other objects and advantages of the invention will become apparent from the detailed description presented hereinbelow.

It has become wide-spread commercial practice in the merchandising of freshly cut meats, and other produce, to wrap individual items such as cuts of meat in films of transparent, plastic material. The thus-wrapped products are visible through the packaging material and can be displayed, for example, in a refrigerated counter.

The characteristics of the wrapping material are very important for this type of application. The package should be attractive and the inner surface of the plastic wrapping material must be resistant to fogging under conditions of refrigeration and during changes of temperature. Furthermore, the meat, poultry or other produce encased in such a package must remain fresh and retain its color during wrapping, display and storage. For example, the package wrapping should transmit oxygen at a sufficient rate when used to encase freshly cut red meats such that the red color or so-called bloom of the meat is preserved. The film must also be capable of being readily and tightly sealed, preferably by heat, to substantially prevent leakage of moisture and juices contained in the completed package.

The wrapping film material should also be relatively impervious to moisture in order to prevent loss of moisture from the encased product, and also the wrapping film must remain flexible and tough and not become brittle, and tear or crack during its use.

Since many polyolefin plastic films inherently possess properties of high permeability to oxygen, low water permeability, and excellent low temperature sealability, transparent polyolefin film or sheeting offers a good material for use as a base in such packaging.

However, because of other inherent properties of polyolefin films, principally the hydrophobic characteristics of the film surface, after moisture-containing products are encased therein, water of condensation rapidly collects and remains on the inner surface as droplets which result in fogging of the film and series impairment of the transparency. In this way, the appearance of the wrapped package is greatly damaged. In particular, it has been noticed that such condensation occurs more noticeably when the wrapped, moisture containing products are subjected to temperature changes such as refrigeration after having been packaged. Subsequently cycles of temperature changes will also produce the fogging effect in a more pronounced fashion.

In order to produce an anti-fogging polyolefin wrapping material having the above described improved characteristics, there is applied to one side of the polyolefin sheeting or film a composition made up of a selected water-soluble polymer together with a selected solid, water soluble, inorganic material such as an inorganic salt.

It has been found that although other materials may be added to the above defined coating composition in order to realize special advantages, it is essential in all instances to include the above two components in the coating compositions used in accordance with the invention.

It is especially preferred in carrying out the invention to use as the polyolefin film, a polyethylene or polypropylene film prepared in such a way as to have the combination of desired properties of high clarity, toughness, and high impact strength. For example, it is possible to produce cast film to give a highly transparent glossy polyolefin film for use as the base. It is also possible to employ as the base film material, copolymers of ethylene and propylene, either with each other or with other monomers such as, for example, those alpha-olefins having from 2 to 8 carbon atoms such as 1-butene, 1-pentene, 1-hexene, 1-heptene, 1-octene and mixed higher alpha-olefins. Other hydrocarbons useful for making copolymers with ethylene and propylene include divinylbenzene, allene, dimethallyl, and isopentene. Comonomers which can broadly be used include mono-substituted ethylenes such as 1-pentene, vinylcylohexene, allyl benzene, $C_8-C_{14}$ mixed alpha-olefins, styrene, allyl naphthalene, and the like, 1,1-disubstituted ethylenes such as alpha-methyl styrene, 2-methyl-butene-1, mixed alpha- and beta-pinenes, camphene and the like, 1,2-disubstituted ethylenes such as indene, acenaphthylene, cyclopentene, norbornylene, cyclohexene, trans-stilbene, 2-pentene and the like, conjugated dienes and trienes such as pentadiene-1,3, 1,2-dihydrobenzene, allo-ocimene, and cyclopentadiene, unconjugated dienes such as mixed octadienes, hexadiene-1,5, 2,5-dimethyl-hexadiene-1,5, 1,4-dihydrobenzene, bicycloheptadiene, bicyclopentadiene, 4-vinylcyclohexene-1, and 4,7-diphenyl cyclopentadiene, acetylenes such as isopropenyl acetylene decadiene-1,9, acetylenes such as isopropenyl acetylene and phenyl acetylene, chloroolefins such as beta-methallyl chloride and chloromethyl norbornylene, and m-chlorostyrene, ethers and epoxides, esters such as vinyl butyrate, vinyl acetate, and methyl acrylate, and nitrogen compounds such as vinyl carbazole, 4-vinyl pyridine and acrylonitrile.

The polyolefin sheeting or film material which is selected to act as the base for the herein disclosed coated packaging and wrapping material, may be, for example, from 0.25 up to 5 mils in thickness and the preferred film thickness is from about 0.5 to 1.5 mils. It is to be understood that films and sheeting materials of either lesser or greater thickness can also be employed in the practice of this invention, depending on the end use intended for the coated product.

The physical properties of the film employed should include relatively high transparency, high permeability to oxygen, low moisture permeability, and low temperature heat sealability to form seals which are leakproof to liquids. In addition, they should generally be as uniform as possible both in the longitudinal and transverse directions and the tendencies to split should be minimized as much as possible.

The basic and most essential component of the coating composition applied to the base polyolefin film or sheeting is a water-soluble, highly substituted cellulose ether, having for example, at least one and perferably two or more ether linkages per anhydroglucose unit and at least one free hydroxyl group per anhydroglucose unit. The substituting groups may be methyl, ethyl, propyl, and any combination of these. It is essential that the cellulose ether employed be substantially water soluble under the conditions of use, which limits to some extent the size of the substituting groups which may be present. For instance any substitution of solubilizing groups on the substituting group itself is desirable, such as hydroxyethyl and hydroxypropyl groups, carboxymethyl groups and the like.

For example, a commercial product, "Methocel[1] 60 HG," has been found to be quite satisfactory for use as one component in the coating composition.

Methocel[1] 60 HG is the trade name for hydroxypropyl methyl cellulose (the mixed methyl and hydroxypropyl ether of cellulose) having a methoxyl content of from 28 to 30 percent and a hydroxypropoxyl content of from 7 to 12 percent. It is prepared by reacting methyl cellulose with caustic soda and then with propylene oxide.

Methocel 60 HG in aqueous solution has the following properties:

Surface tension _____ 44–50 dynes/cm.
                                (25° C.).
Interfacial tension (paraffin oil) ____ 18–19 dynes/cm.
                                (25° C.).
pH _____ Neutral.
Solution stability _____ Stable from pH 2 to
                                pH 12 at 20° C.
Specific gravity 20°/4° C.:
    1% _____ 1.0012.
    5% _____ 1.0117.
    10% _____ 1.0245.

As the other necessary component of the coating composition, there must be present limited and controlled amounts of a water soluble, inorganic salt. Typical water-soluble inorganic salts which have been found to operate very satisfactorily when used in conjunction with the cellulose ethers include sodium chloride, sodium silicate, sodium ortho and pyro phosphates, sodium nitrate, sodium nitrite and sodium sulfate. Corresponding potassium and other alkali metal salts may be used with good results. In general, sodium salts are preferred for food packaging although other alkali metal salts including ammonium salts are useful. Any water soluble salt may be used, if desirable, provided that its presence in effective amounts does not interfere with the solubility of the cellulose ether component.

Although it is not intended to limit the invention to any particular chemical or physical theory, it has been found that the salt is needed for the quick clearing of the fog after it has formed on the film, or possibly to prevent its initial formation, and also to aid in prolonging the anti-fog properties of the film.

While the ratio of the components present in the aqueous coating composition is not critical, it has been discovered that a weight ratio of from 1 part salt to 1 part of cellulose ether up to about 8 to 1 is quite adequate.

Thus, the preferred coating to be put on the film and said coating containing the ingredients above described, is substantially 100% water soluble. The coating thickness on the film may be in the approximate range between .02 micron and 0.4 micron, and preferably is between .05 micron and 0.1 micron. The actual amount of coating used on the film is in the range of about 0.0001 gms./sq. in. In application of the coating on said film, the amount by weight can vary from about 0.00002 gms./sq. in. to 0.0005 gms./sq. in., although the amount of each material required for producing maximum anti-fog properties varies depending on the exact base film and coating components used.

It should be understood that the coating may, if desired, be applied to both sides of the polyolefin film; however, in practice to produce a commercially satisfactory wrapping film, it is preferred to coat one side only of the polyolefin film, the side coated being the side which is in contact with the moisture containing products in order to realize the anti-fogging characteristics and other outstanding advantages of the invention.

It must further be understood that in the selection of the individual components and the concentrations to be included, they must not interact or otherwise affect each other so as to reduce the efficacy of each component as it functions in the mixture, except such synergistic effects as may be realized.

It is essential, however, to have present in the coating composition at the time of its application, at least the two above-outlined components. Neither the substituted cellulose ether nor the water-soluble inorganic salt will function separately to give the good results obtained by the invention. If only the cellulose derivative is used, the coated polyethylene does not produce the proper prolonged anti-fogging results when used to wrap meat and the wrapped packages are later subjected to refrigeration.

If the cellulose derivative is used alone as a coating, an initial anti-fogging effect may result, however, it will not be prolonged, also blocking of the coated film may result. If the salt is used alone, no anti-fogging is obtained; hence, results are totally unsatisfactory.

To achieve the best results, the coating of the base film by the coating composition is done from an aqueous solution containing the cellulose ether and the inorganic salts. The ether gum is slurried in a concentrated solution of the salt until the gum particles are well wetted-out, and the mixture is then diluted to the desired concentration. Other agents, as desired, and as hereinafter disclosed, may be added subsequently or simultaneously to the mixture.

The dispersion or solution preferably in aqueous form is then applied to the polyolefin structure or surface in any convenient and known manner, as by dipping, spraying, brushing, roll coating, gravure coating, etc., preferably at a temperature of 60–120° F. The excess aqueous coating solution may be removed by squeeze rolls, doctor knives, etc. The coating composition should be applied in such amount that there will be deposited upon drying a smooth evenly distributed layer of from 0.02 to 0.4 micron thickness, a thickness of from about 0.05 to 0.10 micron being preferred. The thickness of applied coating should be capable of dispersing moisture condensed thereon into a thin, relatively transparent film, spread evenly over the surface of the coated film.

The coating on the polyolefin is subsequently dried by hot air, radiant heat, or by any other convenient means. Upon drying, there is obtained a coated polyolefin film which is resistant to fogging by droplets of moisture condensed thereon and which is adapted for use, for instance, as a wrapping material or film for moisture-containing food products.

For all items of food packaging, it is also necessary that the components contained in the said coating composition be non-toxic and be substantially odorless.

"Blocking" is the term applied to the tendency of the coated film to adhere to itself when two or more surfaces of the film are held pressed together, for example, when sheets of the film are stocked in storage. It is more pronounced at elevated temperatures and high relative ---
[1] Trademark of the Dow Chemical Co.

humidities. Under normal storage conditions, the maximum temperatures encountered will be between 100° and 110° F. and the relative humidity may run as high at 90–100%. It is desirable that under these storage conditions, the sheeting or film will not stick to itself, or in other words, that it be resistant to blocking. Otherwise, when the film is stored in cut sheet packages or rolled form on cores, for example, the layers will stick together and the film cannot readily be separated for use.

Additional anti-blocking materials which may be used include finely divided waxes and wax-like materials which melt at temperatures above the maximum temperatures encountered in the storage of the film and which are not soluble in the polymer at these temperatures. Specific examples are natural waxes such as paraffin wax, microcrystalline wax, beeswax, carnauba wax, japan wax, montan wax, etc., and synthetic waxes such as hydrogenated castor oil, chlorinated hydrocarbon waxes, long chain fatty acid amides, etc.

Also such materials as starches, finely divided silica, finely divided clays, other salts and the like can be used.

Another group of materials which may be added are finely divided high polymers which soften at temperatures above the maximum storage temperatures and are not substantially soluble in the copolymer. Specific examples include polyvinyl chloride and its copolymers, polystyrene, polymethyl methacrylate, etc.

The products contemplated as being especially suited and well adapted for packaging and for which the sheeting material of this invention is particularly suited for use include moisture containing and emitting products such as fresh meat, poultry, food produce such as fresh fruits and vegetables, bakery products, dairy products, fish, sea foods, flowers and the like.

It is contemplated in the broad aspects of this invention that the coating compositions for the polyolefin films and sheeting materials and the process of applying such coating compositions to polyolefin surfaces, including but without limitation thereto, film, sheeting, material and the like are novel. It is also contemplated that the coated polyolefin structures are themselves novel as well as the sealed packages, structures, and containers formed therefrom either with or without the encasement of the products therein.

While there are disclosed below but a limited number of embodiments of the invention herein presented, it is possible to produce still other embodiments without departing from the inventive concept herein disclosed, and it is desired therefore that only such limitations be imposed on the appended claims as are stated therein.

*Example I*

In order to prepare a water soluble coating mixture, a quantity of the methyl hydroxypropyl ether of cellulose having a methoxyl content of 28–30% and a hydroxypropoxyl content of 7–12%, and a viscosity of 4000 cps. is slurried in a 20% by weight aqueous sodium silicate solution and diluted with water to 0.5% by weight of the cellulose ether. The coating is 100% water soluble. Other additives and modifying components may be added at this time, if desired. The final coating formulation (based on a two-component system) may contain about 80% of the sodium silicate and about 20% of the cellulose derivative although these concentrations are not critical.

This aqueous coating composition is used to coat medium or low density polyethylene film of about 0.5 to 1.3 mil gauge. Desirably but not necessarily, the film was made by the casting technique. An amount of coating of about 0.0001 gms./sq. in. is put no one side only of the polyethylene film by a gravure coating method and the coating dried by radiant heat. The polyethylene film used is prepared from a resin produced in a high pressure process and has the following properties:

Molecular weight (approximate number average) _____ About 20,000
Melt index _____ 1.7±0.3
Softening point, vicat _____° C__ 110
Density _____gms./cc__ 0.935

The coated film was used to encase fresh red meat by heat sealing of the meat inside the package using a specially protected hand iron to effect the seals. The coated side of the film was in contact with the meat. The package was clear and without fog when placed under refrigeration at about 28°–40° F. and remained so during storage in such temperatures for as long as 72 hours. Also, when subjected to repeated cycles of cold storage followed by exposure to room temperature, no fog formed on the inner surfaces of the package.

*Example II*

Results similar to those obtained in Example I can be obtained using polypropylene film. A coating solution containing the methyl hydroxypropyl cellulose ether and sodium silicate prepared as described in Example I, was applied to one side of polypropylene film of about 1.0 mil gauge. The coated film was used to wrap water emitting produce which was subsequently subjected to refrigeration. The package remained clear and without fog during periods of refrigeration at 25–40° F.

*Example III*

An experiment similar to that described in Example I was carried out using polyethylene film coated with an aqueous coating containing 0.5% by weight of methyl cellulose and 5% by weight of sodium pyrophosphate. The coated film was used to encase red meat as done in Example I. No fog was visible at the end of 15 minute, 4 hour, and forty-eight hour time periods of continuous refrigeration.

*Example IV*

In a series of experiments similar to those described in Example III, above, all and part of the sodium pyrophosphate was replaced by sodium chloride in the coating composition. Comparable results were obtained in prevention of fogging on the coated film.

*Example V*

Aqueous coating compositions containing 0.5% by weight of methyl hydroxypropyl cellulose and varying amounts of sodium silicate including 0.5%, 1.0% and 2.0% by weight were prepared. These variations in ratio did not affect the good anti-fog properties obtained with the coating used on polyethylene film.

*Example VI*

In experiments similar to Example III, above, all or part of the sodium pyrophosphate was replaced with sodium sulphate in the coating composition. Comparable results were obtained in prevention of fogging on the coated film.

*Example VII*

In experiments similar to Example III, above, all or part of the sodium pyrophosphate was replaced with sodium nitrate in the coating composition. Comparable results were obtained in prevention of fogging on the coated film.

*Example VIII*

In experiments similar to Example III, above, all or part of the sodium pyrophosphate was replaced with sodium acetate in the coating composition. Comparable results were obtained in prevention of fogging on the coated film.

While this invention has been disclosed and illustrated by the above examples, it will be understood that the in-

What is claimed is:

1. A polyolefin film selected from the grup consisting of polyethylene, polypropylene, and copolymers thereof having a coating thereon comprising a water-soluble cellulose ether and a water-soluble inorganic alkali metal salt, said coating being capable of dispersing moisture condensed thereon in the form of a thin, relatively transparent film, thereby preventing the fogging of said film upon exposure to changes in temperature, the amount of said salt ranging from about 1 to about 8 parts per part of said cellulose ether and the thickness of said coating being between about 0.02 and 0.4 micron.

2. The coated polyolefin film of claim 1 wherein said polyolefin is polyethylene.

3. The coated polyolefin film of claim 1 wherein said polyolefin is polypropylene.

4. A method for treating polyolefin film for preventing fogging thereof in the presence of moisture-containing products, said polyolefin being selected from the group consisting of polyethylene, polypropylene, and copolymers thereof, which comprises the steps of coating one surface of the polyolefin film with a coating composition comprising a water-soluble cellulose ether and a water-soluble inorganic alkali metal salt, whereby said film is rendered resistant to fogging, the amount of said salt ranging from about 1 to about 8 parts per part of said cellulose ether and the thickness of said coating ranging from about 0.02 to about 0.4 micron.

5. The method of claim 4 wherein said polyolefin is polyethylene.

6. The method of claim 4 wherein said polyolefin is polypropylene.

7. A package containing a moisture-emitting material encased in a clear polyolefin film having a coating on the inner surface thereof comprising a water-soluble cellulose ether and a water-soluble inorganic alkali metal salt, whereby any moisture condensed on the inner surface of the film spreads easily over the surface of the film, the amount of said salt ranging from about 1 to about 8 parts per part of said cellulose ether and the thickness of said coating ranging from about 0.02 to about 0.4 micron, said polyolefin being selected from the group consisting of polyethylene, polypropylene, and copolymers thereof.

8. The package of claim 7 wherein said polyolefin is polyethylene.

9. The package of claim 7 wherein said polyolefin is polypropylene.

References Cited in the file of this patent

UNITED STATES PATENTS

| | | |
|---|---|---|
| Re. 24,062 | Horton | Sept. 30, 1955 |
| 2,276,677 | Wallach | Feb. 17, 1942 |
| 2,519,013 | Banigan | Aug. 15, 1950 |
| 2,686,744 | Cornwell | Aug. 17, 1954 |
| 2,772,172 | Carson | Nov. 27, 1956 |
| 2,888,367 | Greyson | May 26, 1959 |
| 2,900,260 | Snyder et al. | Aug. 18, 1959 |
| 2,979,410 | Parlour | Apr. 11, 1961 |

OTHER REFERENCES

"Journal Applied Chemistry," vol. 2, April 1952, pp. 166–172.